(No Model.)
S. E. BURKE.
FEED TROUGH.
No. 545,673. Patented Sept. 3, 1895.
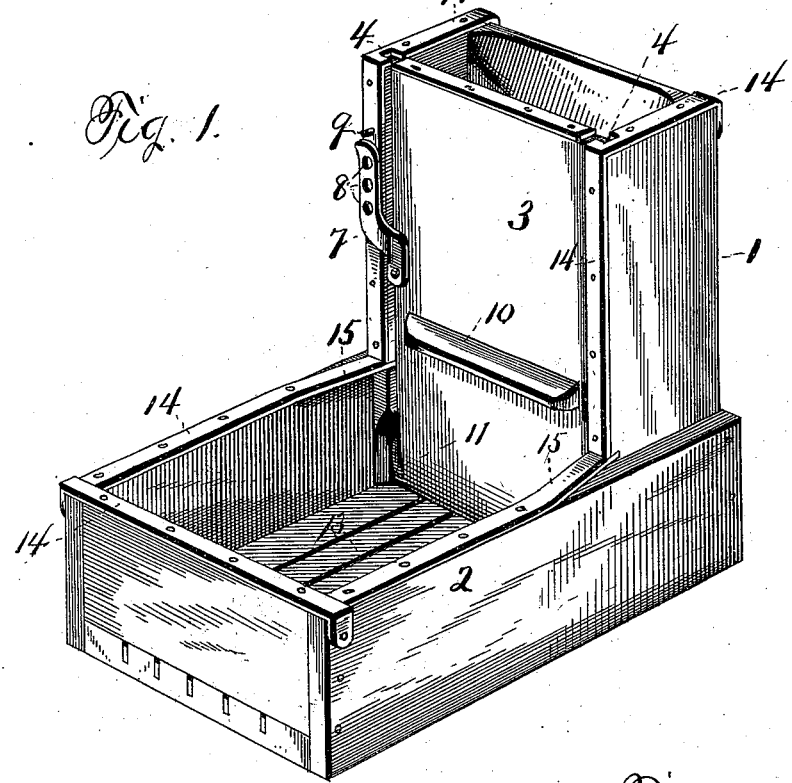
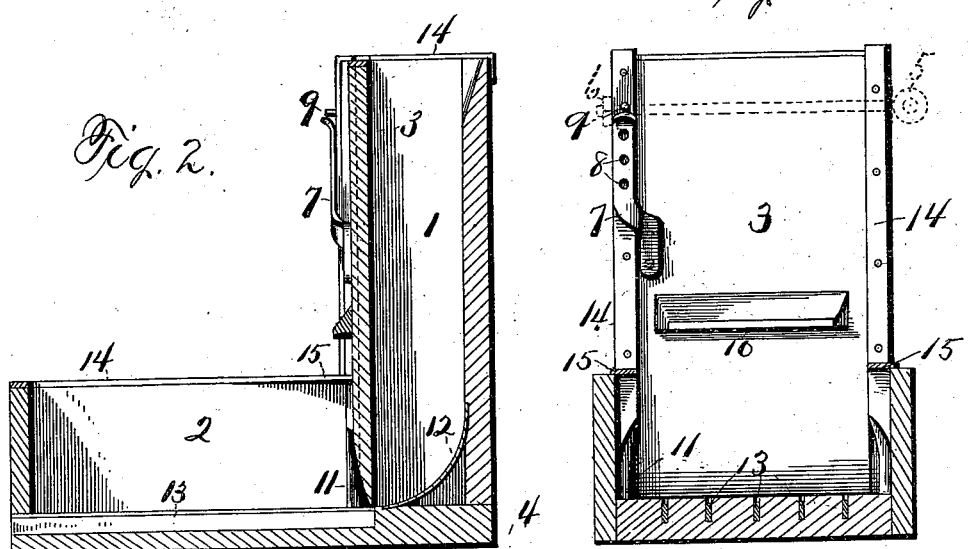
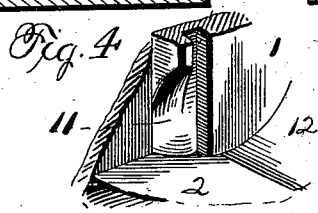
Witnesses
C. J. Williamson
Alfred T. Gage
Inventor
Stephen E. Burke
by W. C. Henderson
Attorney

UNITED STATES PATENT OFFICE.

STEPHEN E. BURKE, OF EDON, OHIO.

FEED-TROUGH.

SPECIFICATION forming part of Letters Patent No. 545,673, dated September 3, 1895.

Application filed October 6, 1894. Serial No. 525,098. (No model.)

*To all whom it may concern:*

Be it known that I, STEPHEN E. BURKE, a citizen of the United States, residing at Edon, in the county of Williams and State of Ohio, have invented certain new and useful Improvements in Feed-Troughs; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to feed-troughs intended more especially for horses, and it has for its object to form a trough inexpensive in construction and which will possess advantageous features of construction, hereinafter particularly described.

The invention consists in the construction and combination of parts, hereinafter described and then sought to be specifically defined by the claims, reference being had to the accompanying drawings, forming a part hereof, in which—

Figure 1 is a perspective of the trough complete. Fig. 2 is a vertical longitudinal section of the same. Fig. 3 is a transverse section through the same, taken on a line immediately in front of the feed-hopper; and Fig. 4 is a detail sectional perspective view showing the recess or concave formed at the junction of the feed-hopper and trough to prevent the feed clogging in the groove in which the adjustable front to the hopper slides.

In the drawings, the numeral 1 designates the feed-hopper, and 2 the feed-trough proper. The feed-hopper is provided with a vertically-slidable front 3, which works in grooves 4, formed in the side pieces of the hopper. The slidable front is adapted to be sustained at various vertical adjustments, so as to leave a space between the lower end of the front and the bottom of the feed-trough, so that the feed can pass from the hopper into the trough in regulated quantities, and when desired can be cut off entirely by dropping the slidable front. The slidable front can be held to its adjustments either by means of a rod 5, (shown by dotted lines in Fig. 3,) which rod will pass from one side to the other of the hopper and through both sides and be provided with a nut 6, so that by tightening the nut the forward portion of the two sides will be caused to bear more or less tightly against the opposite edges of the slidable front, and thus bind the same with sufficient pressure to hold it at the desired vertical adjustment, or I may employ a spring-finger 7, attached at one end to the slidable front and bent laterally so as to lie in front of the forward edge of one of the sides of the feed-hopper, and provided with a series of apertures 8, which are adapted to fit over a pin 9, projecting from the edge of the hopper, so as to hold the slidable front to the vertical adjustment desired. By pressing outwardly the free end of the spring-finger it is freed from engagement with the pin 9, so that the slidable front can be adjusted; and when the latter has been moved to its adjustment the spring-finger resumes its normal position, so that the pin 9 will project through one of the openings therein and hold the front to its place. The slidable front may also be provided with a strip 10, by means of which the front can be raised and lowered.

In order that the feed may not lodge in the grooves 4 at the lower end of the hopper and thus prevent the slidable front from closing down against the bottom of the trough, the lower edges of the sides of the hopper at the point where they join the feed-trough near the bottom thereof are cut away, so as to form recesses or concaves 11, which will allow the feed to pass to the trough in front of the hopper, and thus prevent the grain or feed lodging under the front.

For the purpose of preventing the feed from becoming clogged in the lower portion of the hopper, I place at the bottom of the hopper a shield 12, which is concave and extends from the rear wall of the hopper to within close proximity to the slidable front. This shield will direct all of the feed in the hopper to the front of the hopper and cause the same to pass freely beneath the lower edge of the slidable front, and thus prevent the possibilty of clogging the lower portion of the hopper.

It is the experience of all persons having to deal with horses that many horses will bite or gnaw the bottom of the trough, and in a short time make the same very uneven and in a brief period entirely destroy the bottom. To prevent this it has been proposed to cover the bottom on the inside of the trough with sheet metal; but the objection to that is that in cold weather the tongue of the horse is apt to stick to the metal and the skin be taken off the tongue. Another objection is that the sheet metal is acted upon or corroded by the salt which is frequently mixed with the horse's feed, and in time the action of the salt will eat through the sheet metal, thus leaving sharp points and edges, which will injure the mouth and tongue of the horse. To overcome the objections noted, I form a series of grooves in the bottom of the trough, and in these grooves place strips of metal 13 edgewise and close enough together to prevent the teeth of the horse working between the strips. These strips are also preferably formed with a rounded upper edge and are placed preferably so as to lie below the surface of the bottom. By thus placing the metal strips edgewise, but a comparatively small surface of metal is presented to the inside of the trough, and the objections to a surface of sheet metal covering the entire upper face of the bottom of the trough are overcome, and by having the top edges of the strips below the surface of the bottom the tongue of the horse will not come in direct contact with the metal, and even after the upper surface of the bottom is worn so as to bring it or portions of it on a level with the edges of the metal strips, only so small a portion of the strip is exposed that practically no injury results from their employment; but, on the contrary, the strips increase the durability of the bottom of the trough and prevent the horse from gnawing the same.

The upper edges of the trough and hopper and front edges of the latter are protected by metallic strips 14; and the strips which cover the upper edges of the sides of the feed-trough are bent inwardly at the ends next to the feed-hopper, so as to project over the sides and thus form guards at the rear end of the feed-trough for the purpose of preventing the horse from lifting and throwing the feed over the sides of the trough next to the feed-hopper. This is of material advantage, as most horses will throw more or less of their feed from the trough, and thus waste much of the same. By locating these guards or shields 15 next to the feed-hopper, where the feed passes from the hopper into the trough, the throwing of the feed from the trough is prevented, as stated.

I have described with particularity what I consider to be the best details of construction of the several parts; but it is obvious that changes can be made without departing from the essential features of the invention. I have found, however, from actual use of the trough that the construction described and illustrated gives most satisfactory results, and besides being efficient is simple in its operation and can be manufactured at comparatively little cost.

Having described my invention and set forth its merits, what I claim is—

1. The feed trough having the inside of its bottom protected by a series of metal strips set edgewise into the bottom of the trough, the sides of said strips being covered by the body forming the main portion of the bottom, substantially as and for the purposes described.

2. A feed trough having the inside of its bottom protected by a series of metal strips set edgewise in the bottom with the upper edges of the strips below the surface of the bottom, the sides of said strips being covered by the body forming the main portion of the bottom substantially as and for the purposes described.

3. A feed trough having grooves formed in the inside of its bottom and extending only partially through the bottom, and a series of metal strips set edgewise in said grooves, substantially as and for the purposes described.

In testimony whereof I affix my signature in presence of two witnesses.

STEPHEN E. BURKE.

Witnesses:
H. H. ROOT,
ELNORA TONER.